Nov. 25, 1952 — A. W. CRAVER — 2,618,871
STUMP LIFTER ATTACHMENT FOR TRACTORS
Filed Aug. 23, 1950 — 3 Sheets-Sheet 2

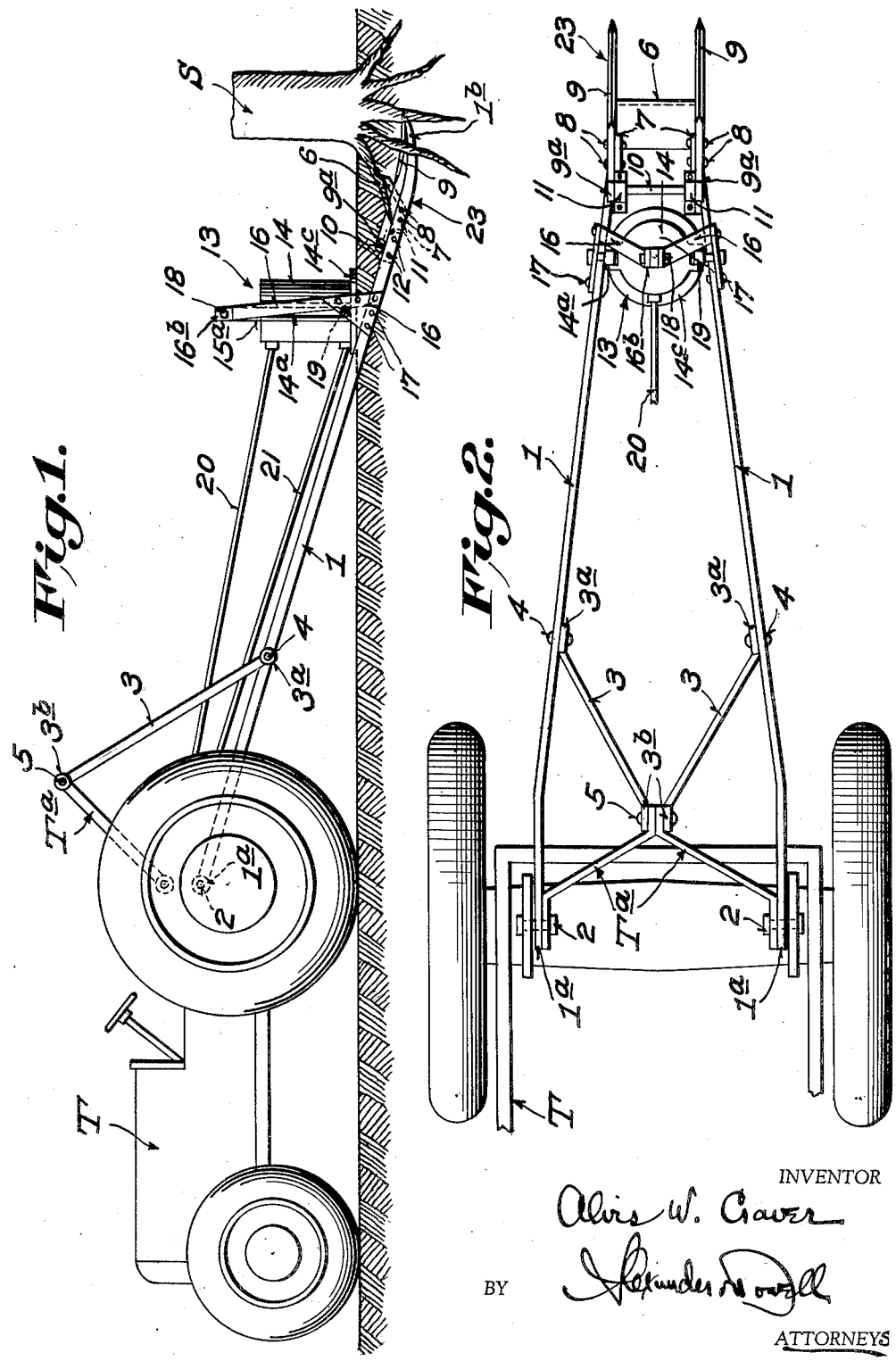

INVENTOR
Alvis W. Craver
BY
ATTORNEYS

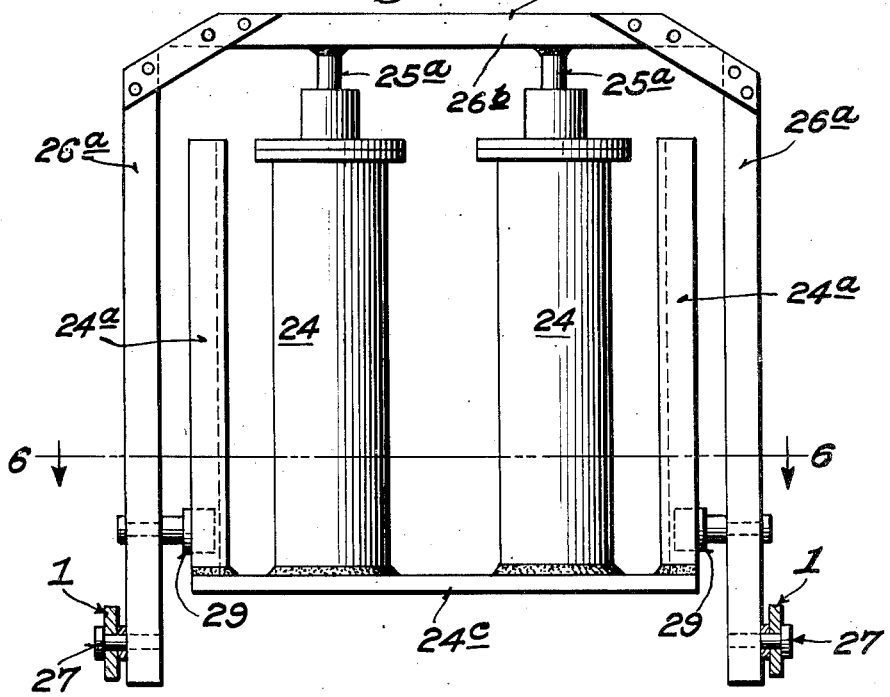
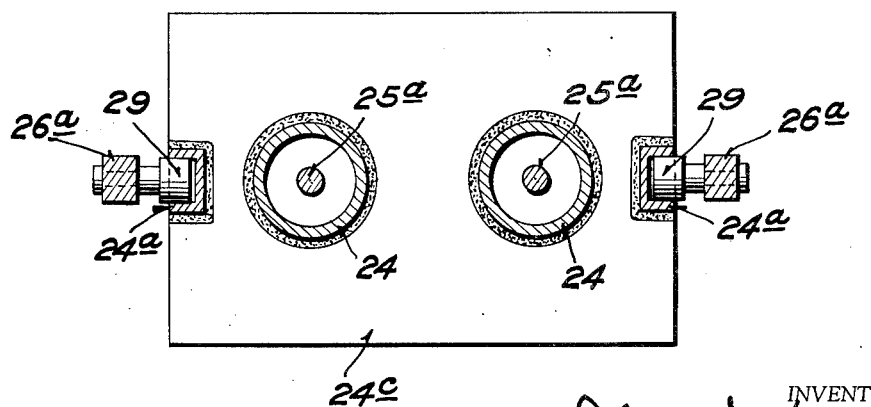

Patented Nov. 25, 1952

2,618,871

UNITED STATES PATENT OFFICE 2,618,871

STUMP LIFTER ATTACHMENT FOR TRACTORS

Alvis W. Craver, Greensboro, N. C.

Application August 23, 1950, Serial No. 180,986

11 Claims. (Cl. 37—2)

My invention is an improved grubbing-tool attachment for tractors, the attachment being especially adapted to remove tree stumps by cutting the roots using a plow operating below ground level and then applying an upward pressure to said plow when it is underlying the stump to dislodge it.

The principal object of my invention is to provide an attachment of the character set forth which may be used in conjunction with standard tractors presently in existence and which will form therewith an efficient combination for stump removing, grubbing, and other general lifting such as log lifting or boulder removing.

Another important object is the provision of an attachment having a raising means for dislodging the stumps which means will connect into the hydraulic system of the tractor and be operated thereby to raise the plow underlying the stump.

A further object of the invention is to provide in such an attachment vertical and horizontal cutting knives on the end of the plow so that when the plow is pushed under the soil below the stump the knives will sever the roots before the raising means is actuated.

Still another object is to provide an attachment adapted to cooperate with the power-lifting mechanism of the tractor itself so that during periods of disuse the attachment may be hoisted out of engagement with the ground to facilitate transportation thereof from one work location to another.

A further object of the invention is to provide an attachment of simple, economical construction, but at the same time rugged enough to withstand the rigorous use encountered in stump removing.

Other objects and advantages of the invention will become apparent during the following description of the drawings wherein:

Figure 1 is a side elevation of the device showing it attached to a tractor and showing the plow end of the device engaging the roots below a stump.

Fig. 2 is an enlarged plan view of the attachment.

Fig. 5 shows a modified form of raising mechanism adapted to exert upward pressure on the plow to dislodge the stump.

Fig. 6 shows a section along line 6—6 of Fig. 5.

Figure 3:
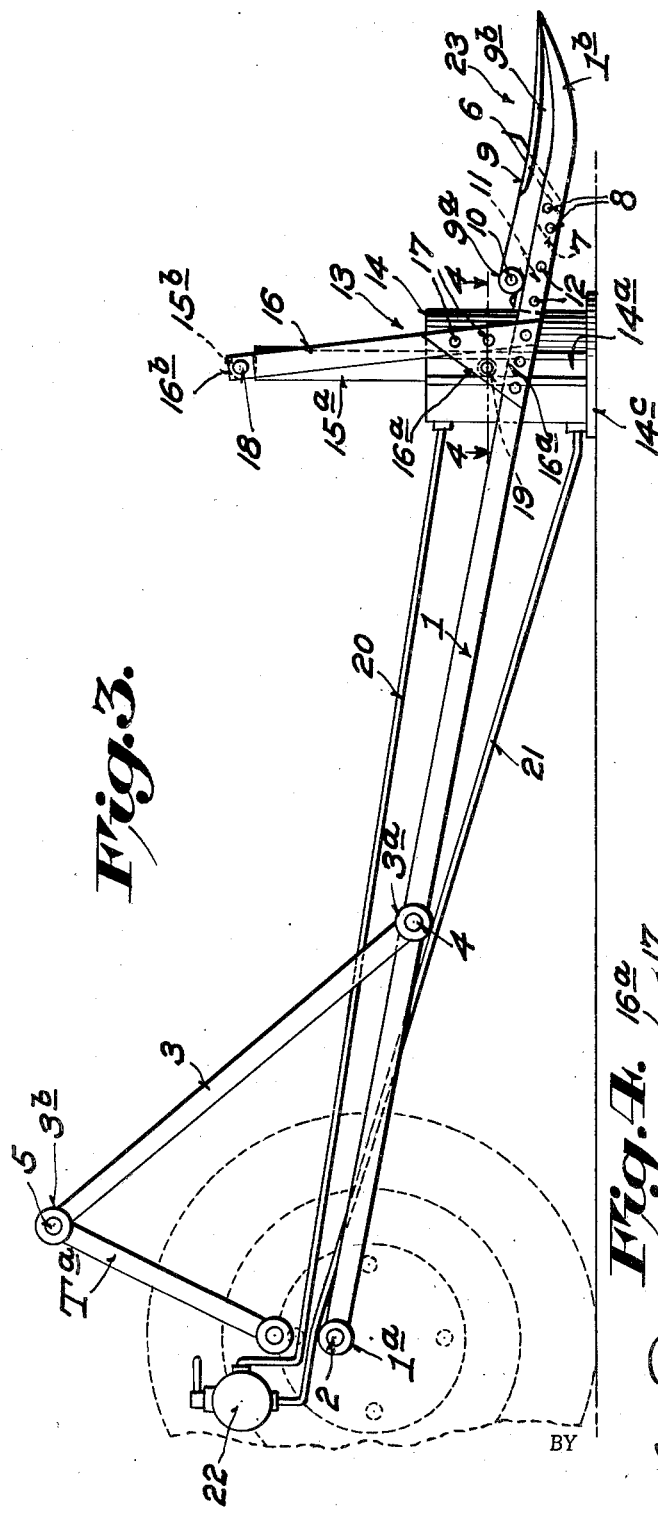
Fig. 3 is a side elevation similar to that shown in Fig. 1 but showing the mechanism in a raised position.

Referring to the drawings, Fig. 1 shows a tractor T having a conventional power lift arm Ta internally geared to the tractor's engine at its inner end. The attachment itself in the illustrated embodiment comprises a pair of parallel frame members 1 pivotally attached to the tractor chassis as at 1a by pins 2. A pair of arms 3 are pivotally attached to the frame 1 as at 3a by pins 4, the inner ends of the arms being connected as at 3b to the outer end of arms Ta as by a pin 5. At their outer ends 1b, the frame members 1 are curved upwardly to form sharp points. The members 1 are joined together near their outer ends by an upwardly inclined transverse knife 6 supported at its outer ends by brackets 7 fixed to the frames 1 as by bolts 8, this assembly serving to maintain the spacing between the frame members 1 as well as to support in operative position the knife 6. In addition, a pair of longitudinal knives 9 are provided, these knives 9 being pivotally attached at their inner ends 9a by pins 10 which are supported in lugs 11 fixed on the frames 1 by bolts 12. The outer ends of the knives 9 are disposed to overlie the ends 1b of the frames 1, as at 9b, or to be pivoted upwardly and rearwardly to permit use of the plow without interference by these knives.

Figure 4:
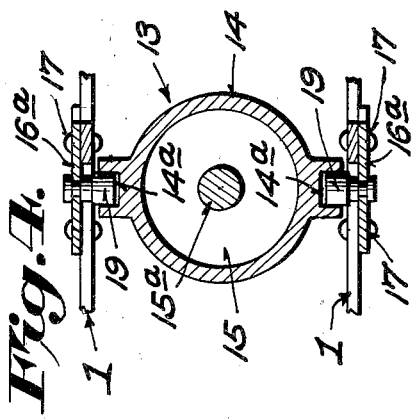
Fig. 4 is an enlarged sectional view along the line 4—4 of Fig. 3.

Located near the outer end of the frame members 1 is a raising mechanism 13 comprising a hydraulic cylinder 14, Fig. 4, having a channel 14a on either side disposed longitudinally of the cylinder. Within the cylinder is a piston 15 having a rod 15a extending upwardly through a hole in the upper end of the cylinder 14. An arched member 16 passes over the cylinder assembly and attaches at its lower ends to the frame members 1, being supported by a plate 16a at each side held in place as by rivets 17. The piston rod 15a has a bore 15b at its upper end and is pivotally connected to the top of the arch 16 by a pin 18 transfixing the bore 15b and bores 16b in the arch. On each of the plates 16a is an inwardly extending roller guide 19 engaging said channels 14a on the sides of the cylinder 14. On the side of the cylinder 14 are two hydraulic lines 20 and 21, respectively, these lines extending to a four-way valve 22, Fig. 3, which is in turn connected to the oil pressure system (not shown) of the tractor. By means of the valve 22, the piston 15 can be raised or lowered in the cylinder 14 by the operator of the tractor. The base of the cylinder 14 carries an enlarged plate 14c which contacts the ground below the cylinder 14 when the cylinder is pressurized to raise the plow end 23 of the attachment.

Figs. 5 and 6 show a modification of the raising means 13 to employ two parallel cylinders 24 utilized to double the available raising thrust without the necessity of increasing the oil pressure. The piston rods 25a, extending from the tops of the cylinders 24 are fixed to the top member 26b of the arch 26, and base member 24c to which the cylinders are fixed carries a pair of upstanding channels 24a. Extending inwardly from the sides 26a of the arch 26 are two roller guides 29 adapted to engage the channels 24a and guide the base 24c and the cylinders 24 as the latter are activated. The lower ends of the arch member 26 are mounted on the frames 1 by pivots 27 so as to allow the raising assembly to pivot as it raises the plow end 23 of the attachment so that the plate 24c will remain in flat engagement with the ground. This modified assembly works in essentially the same way as the first mentioned raising mechanism.

The presently contemplated attachment may just as well be attached to the front of the tractor as to the rear thereof and would operate just as well in that orientation, it being simply a matter of convenience to mount the attachment near the power lift arm T$a$ wherever the latter may be located on the tractor to be used. In the embodiment illustrated in the present drawings, the plow end 23 of the attachment is raised free of the ground by the leftward movement (Fig. 1) of the tractor's power lift arm in Fig. 1 to allow transportation of the assembly from location to location or to permit shifting of the direction towards the stump when more than one approach is necessary during the removal of the stump.

The procedure involved in removing a stump is as follows: The operator points the attachment at the stump so that the plow faces the stump S with the knife 6 centered with respect thereto and the outer knives 9 oriented to pass on each side of the stump S. The power lift arm T$a$ is then lowered so that the plow digs into the ground just ahead of the stump S passing below the latter as shown in Fig. 1. When the tractor is moved rearwardly the knife 6 cuts the roots that project downwardly from the center of the stump S and the knives 9 cut the roots extending laterally outwardly from the stump. The raising cylinder is then operated by turning valve 22 so that hydraulic pressure forces the cylinder 14 and base plate 14c downwardly the alignment of the cylinder with the arch 15 being maintained by the sliding of the channels 14a on the guide rollers 19. At the same time, the power lift arm T$a$ is actuated so that all available upward lift is exerted on the stump S by the plow end 23, and the stump is thereby extricated from the ground, the simultaneous actuation of the power lift arm T$a$ also serving to hold the rear wheels of the tractor on the ground while the cylinder 14 is pressurized. Operationally, the two cylinders 24 shown in Figs. 5 and 6 perform in the same way as the single cylinder 14 although the former assembly gives twice the raising force. In cases where the stump has a large tap-root which can not be cut by the normal push by the tractor of the knife 6 against the root, the cutting is accomplished by pressing the knife 6 against the root and applying hydraulic pressure to the cylinder 14 to raise the knife 6 a short distance thereby clipping off a piece of the root. Several repetitions of this procedure will sever the root and permit removal of the stump. If the stump is particularly large and has many roots, it may be necessary to make several approaches from different directions with the plow utilizing the knives 9 to cut groups of laterally extending roots before driving the plow below the stump to raise it out of the ground. The utility of the present device is not limited to the removing of stumps but may be used to lift heavy objects off the ground and transport them.

I do not limit my invention to the exact forms shown in the drawings for obviously changes may be made within the scope of the claims.

I claim:

1. An attachment of the character specified for use in conjunction with a tractor having attachment mounting lugs, said attachment comprising a frame pivotally connected to said lugs at its inner end and having a bifurcated outer end terminating in sharp prongs; a transverse cutter fixed on said frame near said prongs with its sharpened edge facing outwardly; and means on said frame near said cutter for pressing downwardly against the earth to raise said outer end through and free of the earth, knife blades overlying said prongs with their sharpened edges facing upwardly, and means for pivotally securing said blades to said frame to permit the blades to fold inwardly on said frame for disengagement with the bifurcated end.

2. An attachment of the character specified for use in conjunction with a tractor having attachment-mounting lugs, and having a hydraulic pressure system, said attachment comprising a pair of spaced parallel frame members pivotally attached to said lugs at their inner ends and terminating at their outer plow ends in sharp prongs; a transverse cutter between said frame members attached thereto near said prongs with its sharpened edge facing outwardly; and a vertically disposed piston and cylinder connected to said pressure system and adapted to press downwardly against the earth near said cutter to raise said outer ends through and free of the earth when the piston is pressurized, knife blades overlying said prongs with their sharpened edges facing upwardly, and means for pivotally securing said blades to said frame members to permit the blades to fold inwardly on said frame members for disengagement with the plow ends.

3. An attachment of the character specified for use in conjunction with a tractor having attachment-mounting lugs, and having a hydraulic pressure system, said attachment comprising a pair of spaced parallel frame members pivotally attached to said lugs at their inner ends and terminating at their outer plow ends in sharp prongs; a transverse cutter between said frame members attached thereto near said prongs with its sharpened edge facing outwardly; and a vertically disposed piston and cylinder connected to said pressure system and adapted to press downwardly against the earth near said cutter to raise said outer ends through and free of the earth when the piston is pressurized, an arch-shaped member overlying said frame members and attached at its lower ends thereto; said piston being connected at its upper end to the center of said arch; guide rollers extending inwardly from the lower sides of said arch; and vertical channels on the laterally outer sides of said cylinder engaging said rollers to maintain said cylinder in essentially vertical position.

4. In an attachment as set forth in claim 3, a large plate horizontally fixed on the lower end of said cylinder to increase the bearing area thereof against the earth.

5. An attachment of the character specified for use in conjunction with a tractor having attachment-mounting lugs, and having a power lift arm, and having a hydraulic pressure system, said attachment comprising a pair of spaced parallel frame members pivotally attached to said lugs at their inner ends and terminating at their outer plow ends in sharp prongs; linkage between said frame members and said power lift arm to hoist said attachment out of engagement with the earth; a transverse cutter between said frame members attached thereto near said prongs with its sharpened edge facing outwardly; and a vertically disposed piston and cylinder connected to said pressure system and adapted to press downwardly against the earth near said cutter to raise said outer ends through and free of the earth when the piston is pressurized, knife blades overlying said prongs with their sharpened edges facing upwardly, and means for pivotally securing said blades to said frame members to permit the blades to fold inwardly on said frame members for disengagement with the plow ends.

6. An attachment of the character specified for use in conjunction with a tractor having attachment-mounting lugs, and having a power lift arm, and having a hydraulic pressure system, said attachment comprising a pair of spaced parallel frame members pivotally attached to said lugs at their inner ends and terminating at their outer plow ends in sharp prongs; linkage between said frame members and said power lift arm to hoist said attachment out of engagement with the earth; a transverse cutter between said frame members attached thereto near said prongs with its sharpened edge facing outwardly; and a vertically disposed piston and cylinder connected to said pressure system and adapted to press downwardly against the earth near said cutter to raise said outer ends through and free of the earth when the piston is pressurized, an arch-shaped member overlying said frame members and attached at its lower ends thereto; said piston being connected at its upper end to the center of said arch; guide rollers extending inwardly from the lower sides of said arch; and vertical channels on the laterally outer sides of said cylinder engaging said rollers to maintain said cylinder in essentially vertical position.

7. In an attachment as set forth in claim 6, a large plate horizontally fixed on the lower end of said cylinder to increase the bearing area thereof against the earth.

8. The combination of a tractor having attachment-mounting lugs; and an attachment comprising a frame pivotally connected to said lugs at its inner end and having a bifurcated outer end terminating in sharp prongs; a transverse cutter fixed on said frame near said prongs with its sharpened edge facing outwardly; and means on said frame near said cutter for pressing downwardly against the earth to raise said outer end through and free of the earth, knife blades overying said prongs with their sharpened edges facing upwardly, and means for pivotally securing said blades to said frame to permit the blades to fold inwardly on said frame for disengagement with the bifurcated end.

9. The combination of a tractor having attachment-mounting lugs, and having a power lift arm; and an attachment comprising a frame pivotally connected to said lugs at its inner end and having a bifucated outer end terminating in sharp prongs; a transverse cutter fixed on said frame near said prongs with its sharpened edge facing outwardly; means on said frame near said cutter for pressing downwardly against the earth to raise said outer end through and free of the earth; and linkage means joining said power lift arm and said frame for hoisting said attachment out of engagement with the earth, knife blades overlying said prongs with their sharpened edges facing upwardly, and means for pivotally securing said blades to said frame to permit the blades to fold inwardly on said frame for disengaging with the bifurcated end.

10. The combination of a tractor having attachment-mounting lugs, and having a power lift arm; and an attachment comprising a frame pivotally connected to said lugs at its inner end and having a bifurcated outer end terminating in sharp prongs; a transverse cutter fixed on said frame near said prongs with its sharpened edge facing outwardly; means on said frame near said cutter for pressing downwardly against the earth to raise said outer end through and free of the earth; and linkage means joining said power lift arm and said frame for hoisting said attachment out of engagement with the earth, a hydraulic pressure system on said tractor, and said means comprising an arch-shaped member overlying said frame and attached at its lower ends thereto; a downwardly extending piston connected to the center of said arch; a cylinder on said piston connected to said pressure system and having an enlarged lower end with which to contact the earth; and guide means to maintain the cylinder in essentially vertical position.

11. The combination of a tractor having attachment-mounting lugs, and having a power lift arm; and an attachment comprising a frame pivotally connected to said lugs at its inner end and having a bifurcated outer end terminating in sharp prongs; a transverse cutter fixed on said frame near said prongs with its sharpened edge facing outwardly; means on said frame near said cutter for pressing downwardly against the earth to raise said outer end through and free of the earth; and linkage means joining said power lift arm and said frame for hoisting said attachment out of engagement with the earth, a hydraulic pressure system on said tractor, and said means comprising an arch-shaped member overlying said frame and pivotally attached thereto; a downwardly extending piston connected to the center of said arch; a cylinder on said piston connected to said pressure system and having an enlarged lower end with which to contact the earth; and guide means to maintain the cylinder aligned with the center of the arch.

ALVIS W. CRAVER.

REFERENCES CITED

The following references are of record in the file of this patent:

UNITED STATES PATENTS

| Number | Name | Date |
| --- | --- | --- |
| 1,420,736 | Nissrod | June 27, 1922 |
| 1,910,481 | Smith | May 23, 1933 |
| 2,295,458 | Edwards | Sept. 8, 1942 |
| 2,302,801 | Powelson | Nov. 24, 1942 |
| 2,386,187 | Armington et al. | Oct. 9, 1945 |
| 2,474,037 | Cuthrell | June 21, 1949 |
| 2,505,923 | Taylor et al. | May 2, 1950 |
| 2,508,284 | Oliver | May 16, 1950 |
| 2,535,054 | Ernst et al. | Dec. 26, 1950 |
| 2,535,099 | Slick | Dec. 26, 1950 |